United States Patent Office.

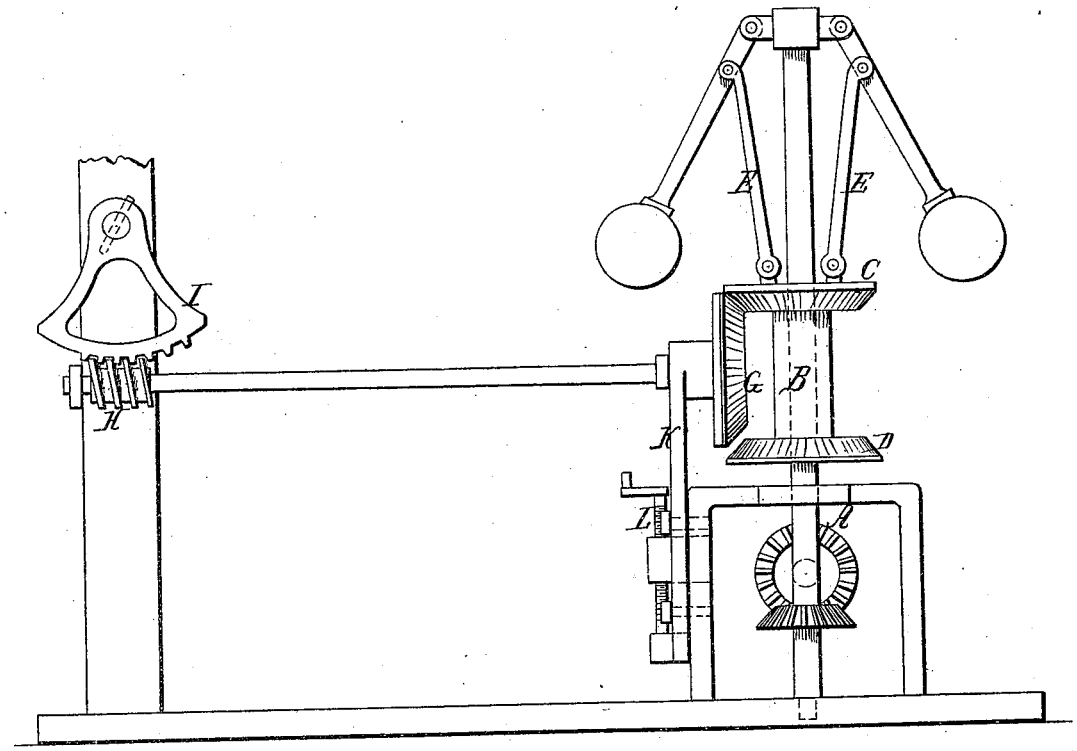

M. MURPHY, OF CHARLOTTE, NORTH CAROLINA.

Letters Patent No. 96,608, dated November 9, 1869.

IMPROVEMENT IN GOVERNORS FOR STEAM AND OTHER ENGINERY.

The Schedule referred to in these Letters Patent and making part of the same.

*To all whom it may concern:*

Be it known that I, M. MURPHY, of Charlotte, in the county of Mecklenburg, and State of North Carolina, have invented a new and improved Governor; and I do hereby declare that the following is a full, clear, and exact description thereof, which will enable others skilled in the art to make and use the same, reference being had to the accompanying drawing, forming part of this specification.

This invention relates to improvements in governors for valves of engines, water-wheels, &c., the object of which is to provide a simple and cheap device; also, to provide an arrangement whereby the same may be adjusted, while in motion, to vary the action for increasing or diminishing the speed of the engine or wheel.

The drawing represents an elevation of my improved governor.

The vertical spindle A, carrying the swinging balls, is provided with a sliding spool or sleeve, B, having bevelled flanges C D, and connected by bars E to the arms of the balls.

These flanges gear alternately with the bevel-wheel G, as the spool is raised or lowered by the weighted arms, turning the said wheel in opposite directions.

H represents a worm on the shaft of the wheel G, gearing with a toothed segment, I, connected to the stem of the valve or gate to be operated.

The shaft of the wheel G is placed in an adjustable bearing, K, capable of being raised or lowered while the governor is in motion.

The speed of the engine or other motor will be higher or lower, according to the position of this wheel G, as, if it stands high, it will be acted on by the wheel C, which opens the valve, while the balls are moving, more rapidly than if standing lower, requiring the balls to fall lower before reaching it.

Any preferred means may be employed for adjusting this bearing, as a screw, L, which I have represented in red, but I do not confine myself to any particular means.

The speed of the engine may be also varied, for a higher or lower rate, by adjusting the connection of the worm-gear with the segment I.

Having thus described my invention,

What I claim as new, and desire to secure by Letters Patent, is—

1. The arrangement of the sliding spool B, connected to the weighted arms, the wheels D C G, worm H, and toothed sector I, all substantially as specified.

2. The combination of the sleeve B, of a governor carrying the wheels D C, and connected to the weighted arms, as specified, and the wheel G, when arranged for adjustment relatively to the said wheels C D, substantially as specified.

M. MURPHY.

Witnesses:
WM. GLEASON,
R. P. ZIMMERMAN.